US006841216B2

(12) United States Patent
Daniel et al.

(10) Patent No.: US 6,841,216 B2
(45) Date of Patent: Jan. 11, 2005

(54) ROTATIONALLY DETERMINATE, POSITIONALLY AMBIGUOUS STRIPED CARPET TILES

(75) Inventors: Sydney D. Daniel, LaGrange, GA (US); David D. Oakey, LaGrange, GA (US)

(73) Assignee: Interface, Inc., Atlanta, GA (US)

( * ) Notice: Subject to any disclaimer, the term of this patent is extended or adjusted under 35 U.S.C. 154(b) by 26 days.

(21) Appl. No.: 10/135,913

(22) Filed: Apr. 30, 2002

(65) Prior Publication Data

US 2003/0190450 A1 Oct. 9, 2003

Related U.S. Application Data

(63) Continuation-in-part of application No. 09/783,354, filed on Feb. 14, 2001.

(51) Int. Cl.[7] ............................ B32B 33/00; B32B 3/10

(52) U.S. Cl. ............................ 428/48; 428/44; 428/85; 428/88; 428/89

(58) Field of Search ............................ 428/44, 47, 48, 428/92, 85, 53, 54, 58, 88, 89; D6/582; D05/62; D25/157, 158, 136, 163

(56) References Cited

U.S. PATENT DOCUMENTS 3,850,783 A * 11/1974 Peters et al. .................. 428/89
3,875,716 A 4/1975 Eusemann
4,055,868 A * 11/1977 O'Neill, Jr. .................... 8/150
5,011,411 A 4/1991 Loewy
5,198,277 A 3/1993 Hamilton
6,203,879 B1 3/2001 Desai
6,526,704 B1 3/2003 Berard et al.
2002/0034607 A1 * 3/2002 Stoyles ........................ 428/95
2002/0136855 A1 9/2002 Daniel et al.

FOREIGN PATENT DOCUMENTS

| | | | |
|---|---|---|---|
| BE | 890 436 | A | 1/1982 |
| EP | 0 698 863 | A | 2/1996 |
| GB | 1 537 727 | A | 1/1979 |

OTHER PUBLICATIONS

Pictures of an installation of Interface Inc.'s "ITO" carpet tiles installed in U–Care of Minnesota of Minneapolis, Minnesota in Oct. 1999 (admitted prior art).

* cited by examiner

*Primary Examiner*—Cheryl A. Juska
(74) *Attorney, Agent, or Firm*—Kilpatrick Stockton LLP; John S. Pratt; Kristin J. Doyle

(57) ABSTRACT

A carpet web and a method of forming a carpet web having a striped pattern and color scheme that permits carpet tiles cut from the web to be installed without regard to relative tile positions and without visibly disrupting the pattern, but rather maintaining the appearance of a broadloom web. The web pattern includes parallel stripes having varying widths and longitudinal discontinuities. The stripes are formed with at least two colors or two shades of a color. The tiles are positionally ambiguous in that they need not be located on the floor in the same position they occupied in the web for the flooring installation to exhibit the desired uniform appearance. Instead, the tiles may be shuffled and laid in any side-by-side or top-to-bottom orientation (provided that uniform rotational orientation is maintained among the tiles) with respect to adjacent tiles without looking out of place to the ordinary viewer and without emphasizing the modularity of the flooring.

17 Claims, 8 Drawing Sheets

FIG. 5

ROTATIONALLY DETERMINATE, POSITIONALLY AMBIGUOUS STRIPED CARPET TILES

CROSS-REFERENCE TO RELATED APPLICATION

This application is a continuation-in-part application of U.S. patent application Ser. No. 09/783,354, filed Feb. 14, 2001, which is incorporated herein by reference.

FIELD OF THE INVENTION

This invention relates generally to carpet tiles and other textile face modular flooring and to methods of designing modular flooring tiles having striped patterns and color schemes that allow for random position placement of the tiles on a floor without visibly disrupting the pattern and so that no tile looks out of place.

BACKGROUND OF THE INVENTION

In part for ease of installation, modular carpet has traditionally been installed in aligned rows and columns, with the edges of each tile aligned with the edges of adjacent tiles ("conventional carpet tile installation method"). Conventional carpet tile has also historically been a product that sought to mimic the appearance of broadloom carpet and to hide or at least de-emphasize the fact that the product was modular. Achieving this result has required, at minimum, that carpet tiles or modules be placed in a flooring installation with the same orientation that the modules had at the time they were produced. This is because conventional production techniques, particularly including tufting techniques, cause the carpet pile to lean or have a nap direction. This property of conventional carpet modules causes a tile within a field of tiles to have a different appearance, particularly under certain lighting and viewing conditions, if it is oriented in a different direction than the tiles with which it is placed. Other considerations, such as the presence of a pattern that spans more than one tile in the web from which the tiles are cut, have also sometimes required that not only the rotational orientation of tiles in an installation be the same but for the tiles to be located in particular relative positions. Indeed, schemes for insuring or facilitating placement of modular carpet in predetermined relative positions (as well as rotational orientation) have been developed. One such approach is suggested in U.S. Pat. Nos. 6,197,400 and 6,203,879, both to Desai.

Textile face modular flooring designers have recently begun to design flooring and flooring installations that do not seek to mask, but rather celebrate, the modularity of the flooring. For instance, modules are installed "quarter-turned" with each tile position rotated 90° relative to each adjacent tile. In other instances, module edges are emphasized to achieve an installation appearance similar to that of ceramic tile separated by grout.

There continues, however, to be substantial demand for flooring designs that do not visually emphasize the modularity of flooring components and instead appear to have a design that spans the entire flooring installation or part of the flooring installation rather than appearing to be confined to individual modules.

Uniform rotational orientation during module installation is facilitated by the presence of direction indicia on the modules, which usually is placed on the back or underside of the modules, and requires careful attention to rotational orientation during installation. Installation in predetermined relative module positions requires even more attention during installation and frequently is very difficult, if not impossible, even with tile edge designs like those described in U.S. Pat. Nos. 6,197,400 and 6,203,879, because of room shape or size and the presence of obstructions.

Carpet tile and other textile face modular flooring has to be highly uniform in size and shape and has to have edge structures that present a uniform floor covering when edges of adjacent tiles are abutting. These requirements make it a practical necessity for such products to be produced by forming a web of tile material that is at least somewhat wider than the width of one flooring module, and preferably a bit wider than some multiple of modules, and then cutting modules from that web. For instance, carpet tile is typically produced by manufacturing a web a bit more than six feet wide and then cutting from it tiles that are eighteen inches square, or by manufacturing a web a bit more than two meters wide and then cutting from it tiles that are one-half meter square. In each case, four tiles can be obtained across the web. While it is relatively easy to cut modules from such a web that have a desired size with a high level of accuracy, it is difficult to position the longitudinal cuts or module separation lines accurately with respect to predetermined positions on the web. It is likewise difficult to position the transverse cuts or module separation lines accurately with respect to predetermined positions on the web, at least without substantial material waste.

Another approach to some of the challenges associated with modular flooring described above has been to produce first a web, and then modules of flooring, that are uniform in color and carry no pattern, so that only nap direction is important and there are no problems of registration between a tile pattern or design and the tile edges. This makes relative tile position irrelevant. In other instances, tile producers have sought to address the design-to-module registration issues by first producing a uniform color tile or module and then printing a design on the face of the tile that is positioned by reference to the tile edges after the tile is cut from the web. There are, however, design, cost and functional limitations associated with printing on textile face modular flooring. A third approach has been to use relatively small design elements so that such elements at a tile edge will not look odd near tile edges or if they are cut by tile edges.

Some design types present particular problems for use on modular flooring. One such difficult design type is parallel stripes. To ensure a fluid appearance in a flooring installation, the tiles cut from a web having uninterrupted stripes extending along its length obviously must be oriented so that all of the stripes of the tiles are oriented in the same direction. However, this alone will not achieve an aesthetically desirable installation appearance.

First, attention has to be paid to the appearance at the places where side-by-side tiles are abutting in an installation so that there is not an out-of-place or odd appearing stripe at that location. Additionally, attention may be drawn to the place where top-to-bottom tile abutment occurs, i.e, where the ends of stripes on one tile meet the ends of stripes on another tile.

One could imagine a design having uniform-width, parallel stripes that fall in precisely the same locations on each tile. It would then be possible to position such tiles in the same orientation on a floor to produce a uniform pattern of uninterrupted, uniform, parallel stripes across a room. Such carpet tiles would be very difficult to produce, however, using conventional production techniques where a carpet web is produced and then cut into tiles, because it is difficult to achieve identical tiles.

One reason for this is that it is difficult to locate the cuts that separate the web into tiles precisely in predetermined locations. This will result in different width stripes at tiles edges (where the stripes are of uniform width on the carpet web). Additionally, unless tiles are positioned so that the stripes on one tile are precisely aligned with the stripes on an adjacent tile, the appearance of continuous stripes on the web will not be reproduced on the floor. This is difficult to do unless the tiles are reassembled exactly as they came from the web. It is unlikely that stripes will align from one tile to the next because, among other reasons, of variation in the location of longitudinal cuts on the web. Imprecise cutting can result in stripes of a tile appearing offset from stripes of adjacent tiles, thereby betraying seams and ruining the appearance of continuous stripes in the flooring installation. Additionally, as noted above, the position of the longitudinal cuts relative to the stripes into which or next to which they fall can create a stripe that appears to be wider or narrower than those in the design (except, of course, where the modules are assembled on the floor in the same side-by-side location they had in the web and the split stripe is re-assembled). Given the necessity but difficulty of attaining cutting precision with conventional striped designs, flexibility in placement of the tiles having a conventional striped pattern of equal-width, continuous stripes is severely limited.

Consequently, there remains a need for modular flooring design and production techniques that enable the creation of flooring designs having parallel stripes notwithstanding the above-described and other constraints of conventional modular carpet construction and installation.

SUMMARY OF THE INVENTION

This invention addresses the above-described problems by providing a broadloom carpet web and a method of forming a carpet web having a striped pattern and color scheme that permits carpet tiles cut from the web to be installed without regard to relative tile positions and without visibly disrupting the pattern, but rather maintaining the appearance of a broadloom web. In order to accomplish this, the rotational orientation of the tiles should be uniform (i.e., consideration must be given to the rotational orientation of the tiles relative to each other and thus the tiles are "rotationally determinate") so that the stripe and nap direction will be the same. However, a tile need not be located on the floor in the same position it occupied in the web for the flooring installation to exhibit the desired uniform appearance (i.e., the tiles are "positionally ambiguous"). Instead, the tiles may be (and should be) shuffled and laid in any side-by-side or top-to-bottom orientation (provided that uniform rotational orientation is maintained among the tiles) with respect to adjacent tiles without looking out of place to the ordinary viewer and without emphasizing that the flooring is modular, thereby still achieving an appearance of continuity across the entire installation as if the tiles were part of a broadloom web. While the tiles may be laid in a number of different positions relative to each other and thus each different configuration technically creates a different pattern, all of the patterns have the overall same appearance. Thus, placement or replacement of one tile does not change the overall aesthetic effect. The objectives of this invention are achieved by utilization of certain design elements in the design of the pattern appearing on the carpet web from which tiles are produced or in the design of the patterns appearing on the tiles and by tile placement techniques in installing flooring of this invention.

Two types of positional ambiguity can be achieved in a carpet tile design having parallel stripes. (For the purposes of this discussion, parallel stripes on a tile are said to be parallel to tile "sides" and to intersect with, or end at, a tile's "top" and "bottom.") The first type of positional ambiguity is "side-to-side" positional ambiguity, which means that tiles can be installed in any side-to-side positions without a tile looking out of place and without the location of side-to-side seams being visually prominent. The second type of positional ambiguity is "top-to-bottom" positional ambiguity, which means that tiles can be installed in any top-to-bottom positions without a tile looking out of place and without the location of top to bottom seams being visually prominent in a manner that calls attention to the modularity of the flooring installation.

Side-to-side positional ambiguity is achieved in the design and placement of stripes on the carpet web relative to the web regions where longitudinal partition cuts will occur. Top-to-bottom positional ambiguity is achieved by introducing in the web design, and therefore in some of the tiles cut from the web, longitudinal discontinuities that mask or take attention away from longitudinal discontinuities that typically occur at top-to-bottom tile interfaces.

As used in this application and patent, "stripes" are visibly different regions of the flooring face having portions of relatively uniform width that typically are somewhat longer than wide. "Longitudinal discontinuities" are places in the flooring where one or more stripes end and other stripes extending in the same direction begin. Longitudinal discontinuities have an appearance similar to that produced by cutting a group of stripes transverse to their longer dimension and offsetting the lateral positions of the two parts formed by the cut. Thus, longitudinal discontinuities in the design mimic the appearance of cutting the flooring web transverse to the direction of the stripes and offsetting the relative positions of the two web members.

The tiles of this invention may be produced by first producing a broadloom carpet web having a pattern exhibiting the characteristics described herein and then cutting the web into tiles in the conventional ways that tiles are typically cut from a carpet web produced for that purpose. The web design can be rendered in any conventional manner, such as by printing a tufted or other web or by weaving the pattern. The techniques of this invention are particularly well suited, however, for production by rendering the pattern through tufting with yarn pre-dyed in suitable colors.

Web designs in accordance with this invention have parallel longitudinal stripes running along its length. In a tufted product, the stripes on the web may be created by color contrast between adjacent yarns on the web. The appearance of a stripe on the web is impacted both by the "thread-up" of the tufting machine used to create the web (i.e., the arrangement of yarn colors dedicated to the needles of the machine) and the height of a yarn tuft compared to surrounding yarn tufts. By controlling the "thread-up" and height of the yarn tufts, stripes of varying widths and lengths may be formed on the web.

Side-by-side positional ambiguity is achieved by using stripes that have different widths. Thus, lateral variations in placement relative to the web pattern of longitudinal cuts when cutting the web into tiles that vary the width of stripes split by a cut will not create a stripe that looks out of place because the design already incorporates stripes of various widths. Rather, if adjacent edges of two tiles placed on a floor form a particularly wide or narrow stripe, that stripe will not look out of place given the variety of stripe widths already incorporated into the pattern. Additionally, in some designs in accordance with this invention, relatively wide stripes are located in the regions where longitudinal cuts will occur to insure that all longitudinal cuts will fall within those stripes.

Similarly, the height of the yarn tufts is adjustable so that the prominence of a stripe formed by those yarn tufts varies along the length of the web. Longitudinal discontinuities can be created by adjusting yarn tuft height to create the appearance that at least some of the stripes end at a point along the length of the web and new stripes begin at that ending point. These longitudinal discontinuities prevent the stripes from appearing aligned, but rather give the appearance that they are offset from each other. This misalignment, intentionally built in to the pattern, obviates the need to precisely cut the tiles and place them on the floor so that the stripes of adjacent tiles are longitudinally aligned. In short, misalignment of the stripes of adjacent tiles does not appear out of place or jeopardize the appearance of continuity given that such misalignment occurs repeatedly in the pattern, even within a single tile.

In its simplest form, the striped patterns of this invention are formed using two yarn colors or two shades of a yarn color. However, any number of yarn colors or shades of colors can be used to create any number of different colored stripes on the web. By creating a thread-up that alternates between the colors as well as adjusting yarn tuft height, patterns of stripes in accordance with this invention may be created on the web.

While it is an object of this invention to provide modular flooring tiles having striped patterns and color schemes that allow for random position placement of the tiles on a floor without visibly disrupting the pattern and so that no tile looks out of place (i.e., positionally ambiguous), the tiles need not be installed using the conventional carpet tile installation method. Instead, the tiles can be installed in a staggered orientation.

Assume that the carpet tiles are installed in a room so that the stripes extend along the length of the room. The design of the width and placement of stripes in the present pattern results in the transition from one tile to the next across the width of the flooring installation being virtually undetectable. Thus, the tiles can be installed in side-to-side alignment (i.e., in aligned "columns") without the vertical seams created by such side-to-side positioning being visually prominent across the flooring installation.

However, installation of the tiles of this invention with their "top" and "bottom" edges aligned (i.e., in aligned "rows") may make the horizontal seams (i.e., the aligned rows of "top" and "bottom" seams) visually apparent. This is because a longitudinal discontinuity is generally created when the top edge of one tile is positioned adjacent the bottom edge of another tile. Thus, if all the seams are aligned horizontally, there will be aligned rows of longitudinal discontinuities across the flooring installation. This is perfectly acceptable in some designs of this invention and in some installations.

However, in other situations the appearance of installations of tiles of this invention may be improved if they are installed as aligned columns that do not form aligned rows of modules. For example, the tiles may be installed so that a column of tiles appears shifted up or down relative to adjacent tile columns ("the ashlar installation method"). This staggers the horizontal seams formed by the adjacency of the "tops" and "bottoms" of tiles within the columns to prevent the appearance of aligned horizontal rows of longitudinal discontinuities and thus helps de-emphasize the presence of the horizontal seams. Use of such ashlar installation together with tiles in accordance with the present invention having longitudinal discontinuities within the tiles can result in a pattern on the floor having longitudinal discontinuities that appear to be so randomly placed that it is not visually apparent that any of the discontinuities are associated with tile interfaces, thereby substantially masking the fact that the flooring is modular.

In other installations, in light of the positional ambiguity of the carpet tiles of this invention, the appearance of a broadloom carpet is achieved even if the horizontal seams are aligned, as results with the conventional carpet tile installation method and with the brick-laid installation method (whereby the rows are aligned, but the columns are staggered). Thus, while ashlar installation in some instances may be preferable, it certainly is not the only installation method contemplated by this invention.

Moreover, while the rotational orientation of the tiles can be uniform across the entire installation so that the tiles are all installed with the stripes oriented in the same direction, it need not be. Rather, alternating tiles may be "quarter-turned" so that the stripes on one tile are oriented at a 90° angle relative to the stripes on surrounding tiles. Such installation emphasizes modularity but can be quite attractive using tiles of this invention.

It is an object of this invention to provide rotationally determinate, positionally ambiguous carpet tiles.

It is an object of this invention to provide striped modular flooring tiles that exhibit side-to-side positional ambiguity.

It is an object of this invention to provide striped modular flooring tiles that exhibit top-to-bottom positional ambiguity.

It is an object of this invention to provide modular flooring tiles having striped patterns and color schemes that allow for random position placement of the tiles on a floor without visibly disrupting the pattern and so that no tile looks out of place.

It is another object of this invention to provide carpet tiles having stripes of different widths.

It is yet another object of this invention to provide carpet tiles having longitudinal discontinuities.

It is still another object of this invention to provide carpet tiles that may be installed quickly and efficiently.

It is also an object of this invention to provide a pattern on carpet tiles that allows for a carpet tile to be easily placed or replaced in an installation without changing the overall aesthetic effect.

BRIEF DESCRIPTION OF THE DRAWINGS

FIG. 5 illustrates tiles cut from a carpet web bearing a pattern of this invention and installed on a floor using the brick-laid installation method.

DETAILED DESCRIPTION OF THE DRAWINGS

Figure 1:
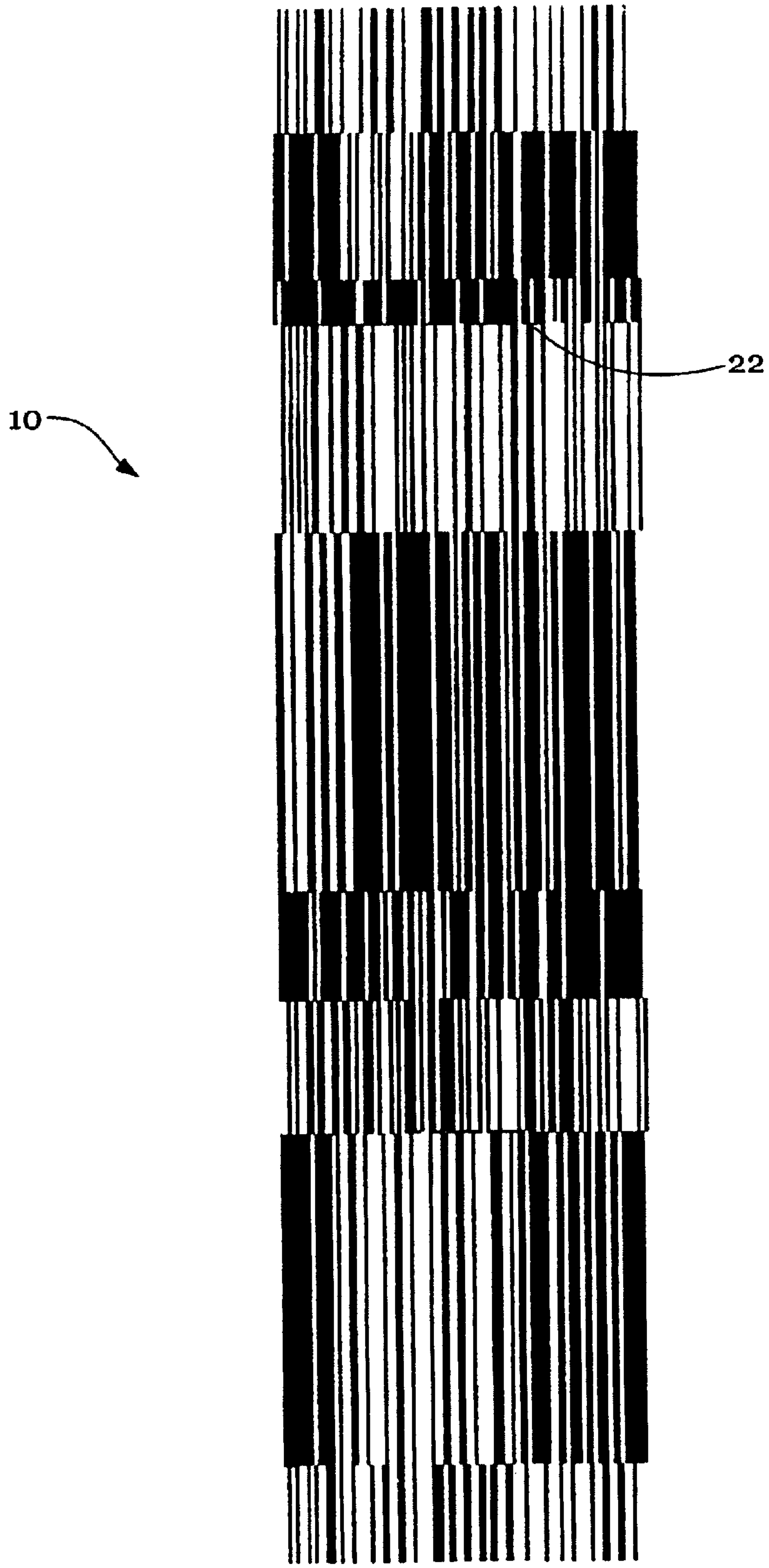
FIG. 1 is a top plan view of a one embodiment of a carpet web pattern of this invention.
Figure 2:
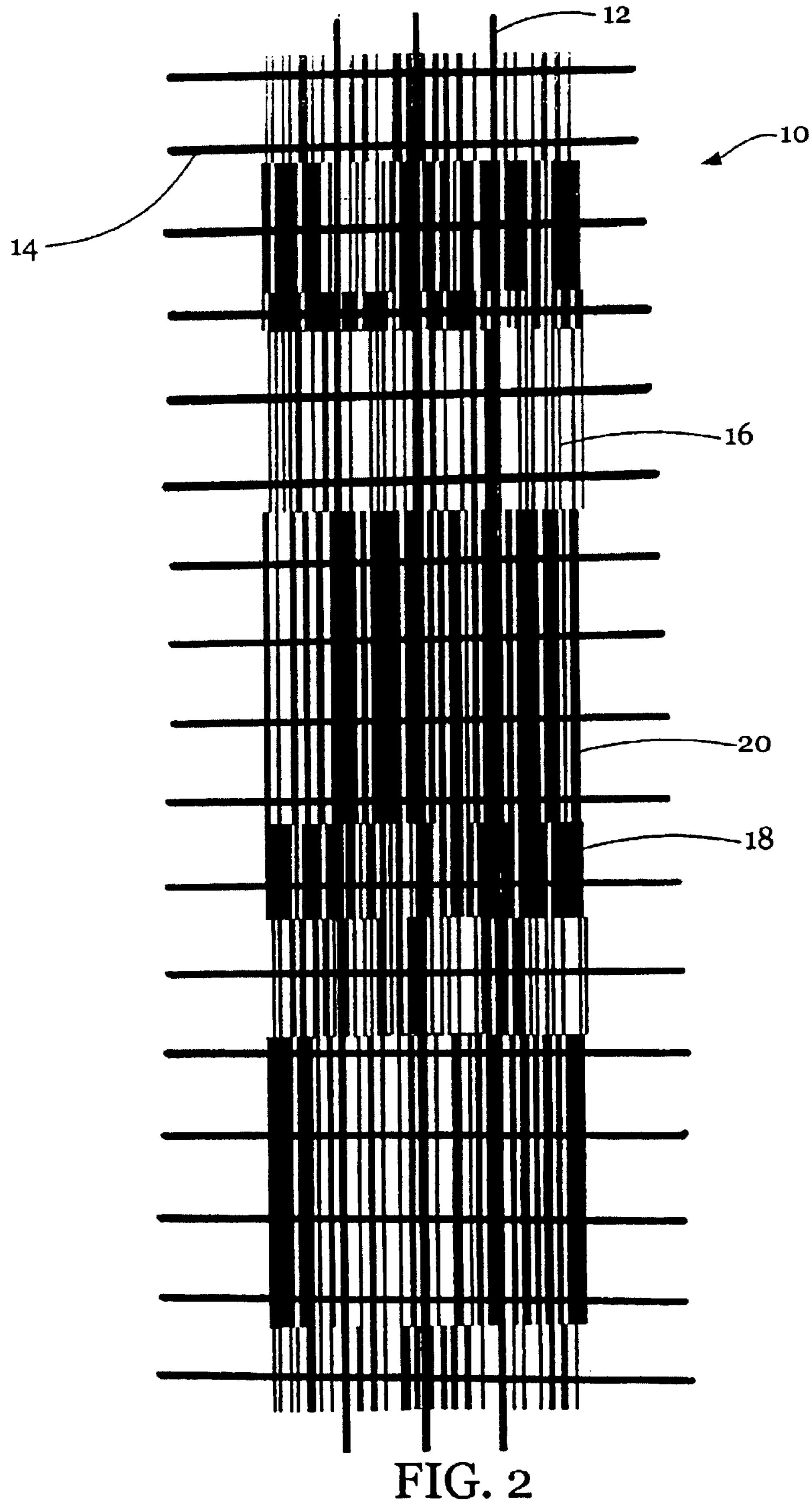
FIG. 2 illustrates a web bearing the pattern of FIG. 1 with longitudinal and horizontal partition lines to create tiles.

FIG. 1 illustrates a carpet web pattern 10 consistent with one embodiment of this invention. FIG. 1 shows one "repeat" of the pattern 10. Generally, a carpet web will be formed with the pattern 10 repeating along its length, i.e. with multiple pattern repeats. FIG. 2 illustrates one way of partitioning a web bearing pattern 10 into carpet tiles. In FIG. 2, longitudinal partition lines 12 and horizontal partition lines 14 partition the web pattern 10 into individual, square carpet tiles 16. Note, however, that the web need not be partitioned into square tiles, but rather the tiles may be cut into other rectilinear shapes, such as rectangles.

The carpet tiles preferably are not all cut from a single pattern repeat. Thus, the length of a single pattern repeat is preferably not an even multiple of the span of the tiles cut from the web. In this way, at least some of the tiles will comprise a part of the pattern from at least two repeats and the horizontal partition lines will fall in different locations on adjacent repeats of the pattern, causing the tiles cut from one repeat to differ from those cut from the next repeat.

The pattern 10 includes longitudinal stripes that extend along the length of the web. The stripes are oriented parallel to each other and preferably have varying widths across the web. For example, in FIG. 1 stripe 18 is wider than stripe 20. Because the stripes do not have a uniform width, little precision relative to the pattern 10 is required when making longitudinal cuts when cutting the web into tiles. Rather, if adjacent edges of two tiles placed on a floor form a particularly wide or narrow stripe, such stripe will not look out of place given the variety of stripe widths already incorporated into the pattern. Precision is required during cutting, however, to ensure that the web is cut so that the sides of the stripes are generally parallel to the longitudinal partition lines 12 that define the tile edges (see FIG. 2).

Moreover, at least some of the stripes (or groups of stripes) of the carpet web pattern 10 preferably appear not to extend the entire length of the web. Rather, as clearly seen in FIG. 1, the length of at least some of the stripes ends at a point along the length of the web pattern, at which point another stripe of a different color or intensity begins. This contrast between abutting stripes creates longitudinal discontinuities 22, or visual transverse boundaries, which emphasize at least partial misalignment of the stripes along the length of the web pattern 10. As shown in FIGS. 2–7, these longitudinal discontinuities 22 will appear on at least some of the tiles cut from a web bearing web pattern 10, thereby obviating the need or the desire to align the stripes of adjacent tiles during carpet installation by making the misalignment that occurs where tiles abut appear to be consistent with the longitudinal discontinuities 22 incorporated in the rest of the design.

Figure 8:
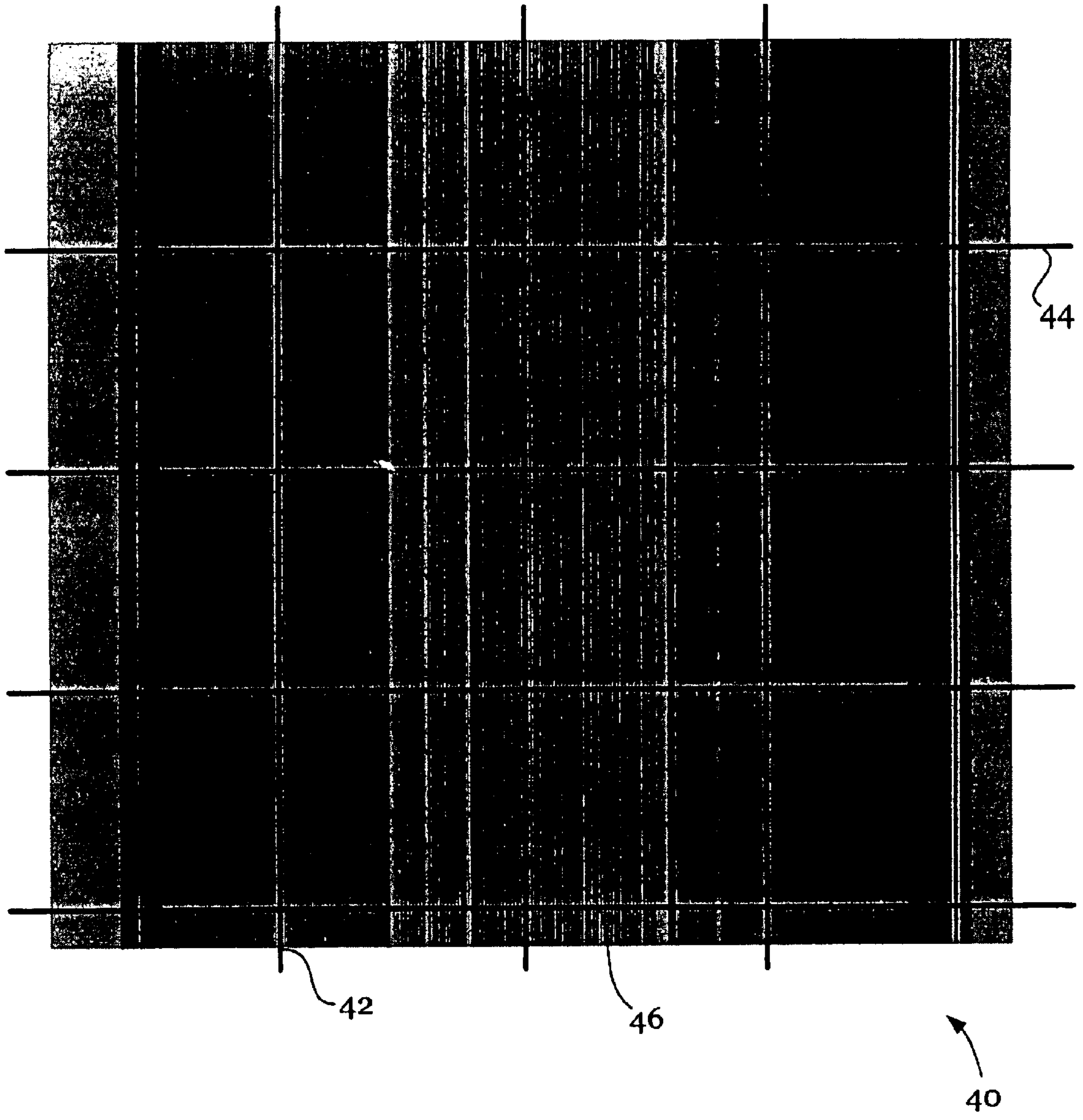
FIG. 8 illustrates a top plan view of an alternative embodiment of a carpet web pattern of this invention.

As explained above, this invention can include one or both of longitudinal discontinuities to provide top-to-bottom positional ambiguity and stripe design to provide side-to-side positional ambiguity. FIG. 8 illustrates a web pattern 40 having stripes of different widths that extend along the full length of the web so that there are no longitudinal discontinuities in the pattern. Longitudinal partition lines 42 and horizontal partition lines 44 partition the web pattern 40 into individual, square carpet tiles 46. Tiles 46 can be assembled on a floor using, for example, the conventional, brick-laid, ashlar, or quarter-turned carpet tile installation method, as described below. In such an embodiment of this invention, tiles cut from adjacent positions along the length of the web 40 will be identical, while adjacent tiles cut across the width of the web 40 can be, but do not have to be, different.

A web in accordance with this invention can be rendered in any conventional manner, such as by printing a tufted or other web or by weaving the striped pattern. The techniques of this invention are particularly well suited, however, for production by rendering the pattern through tufting with yarn pre-dyed in suitable colors. In a tufted product, the stripes on the web may be created by color contrast between adjacent yarns on the web. At least two different yarn colors or shades of a yarn color are used to fabricate the pattern—a first color to form a first set of stripes and a second color to form a second set of stripes. The contrast between the first and the second color or shade defines the stripes. Obviously, however, more than two colors could be used so that the pattern includes stripes of a variety of colors and combinations of colors.

In summary, the preferred guidelines for creating web patterns in accordance with this invention are as follows. All of these guidelines need not necessarily be incorporated in every pattern.

1. Utilization of parallel, longitudinal stripes parallel to the longitudinal partition lines that define the tile edges.
2. Utilization of stripes of different widths.
3. Utilization of groups of stripes having lengths that do not appear to extend the entire length of the web, thereby creating longitudinal discontinuities.
4. Utilization of at least two different colors or shades of a color to fabricate the pattern.

The web pattern 40 of FIG. 8, does not incorporate guideline 3.

The carpet web pattern 10 shown in FIG. 1 practices all of these preferred guidelines and is preferably, but as explained above does not have to be, manufactured using a conventional carpet tufting machine. The following describes an example of this invention produced on a tufting machine. For example, a tufting machine having two rows of needles may be used. The appearance of a stripe on the web is impacted both by the "thread-up" of the tufting machine used to create the web (i.e., the arrangement of yarn colors dedicated to the needles of the machine) and the height of yarn tufts compared to surrounding yarn tufts. By controlling the "thread-up" and height of the yarn tufts, stripes of varying widths and lengths may be formed on the web.

Each row of needles preferably has a different gauge. Each needle is threaded with a dedicated yarn color. The stripes are formed on the web by color contrast between adjacent yarn colors on a single needle row and by color contrast between the yarn colors on the first needle row and the second needle row. While the following discussion sets forth examples of "thread-ups" that result in a web pattern that practices the above guidelines, any "thread-up" of the machine may be created in accordance with this invention so long as the resulting web, when cut, results in stripe patterned, rotationally determinate, positionally ambiguous carpet tiles.

EXAMPLE 1

To create a pattern having stripes formed from only two colors or shades of a color (colors A and B), a tufting machine having a first row of ⅛ gauge needles, each alternately threaded with color A and color B, and a second row of ¼ gauge needles, each alternately threaded also with color A and color B, may be used.

EXAMPLE 2

To create a pattern having stripes formed by more than two colors or shades of colors, additional colors may be substituted for color A or color B in some of the needles. For example, the following "thread-up" could be used:

Row of ⅛ Gauge Needles

| Needle Position | Yarn Color |
|---|---|
| 1–20 | C |
| 21–40 | A |
| 41–60 | B |
| 61–70 | C |
| 71–80 | B |
| 81–120 | A |
| 131–130 | C |
| 131–140 | B |
| 141–160 | C |

Row of ¼ Gauge Needles

| Needle Position | Yarn Colors |
|---|---|
| 1–23 | DE |
| 24–33 | FE |
| 34–53 | FG |
| 54–69 | HG |
| 70–80 | HD |

With such a "thread-up," a background color extends across the width of the web. While only one background color need be used, preferably a few different colors (e.g., color A, B, or C), each of which extend across a portion of the width of the web, are used. In the above example, the background colors are threaded on a first row of ⅛ gauge needles. Background color C is threaded on and extends across the width of the web tufted by needles 1–20, color A is threaded on and extends across the width of the web tufted by needles 21–40, color B is threaded on and extends across the width of the web tufted by needles 41–60, etc. With this color scheme, every tile cut from the web will have a similar mixture of background colors, thereby creating background uniformity among the tiles. To this end, it may be preferable, but certainly not required, that all of the background colors have similar intensities so that no one background color significantly stands out from the other background colors.

In any given portion of the web, the stripes are preferably formed by a background color and a set of at least two primary colors, in this case colors D, E, F, G, and H. As with the background colors, the primary colors may have, but do not have to have, similar intensities. In the above example, the primary colors are threaded on a second row of ¼ gauge needles. A set of colors D and E are alternately threaded on and extend across the width of the web tufted by needles 1–23, a set of colors F and E are alternately threaded on and extend across the width of the web tufted by needles 24–33, a set of colors F and G are alternately threaded on and extend across the width of the web tufted by needles 34–53, etc. A transition between sets of primary color (e.g., from DE to FE between needles 23 and 24 on the second needle row) preferably does not occur at a same position on the web as a transition between background colors (e.g., from C to A between needles 20 and 21 on the first needle row), thereby facilitating a more gradual color change across the web.

In addition to the "thread-up," the pattern of stripes is created on the carpet web by controlling the height of the yarn tufts, particularly those tufted by the ¼ gauge needles. The farther the yarn is pushed through the primary backing, the greater its height in the finished carpet tile and the more predominant the color of the yarn. Moreover, the top of the yam tufts may be sheared to further contribute to the prominence of a certain color yarn. In these ways, prominence of a certain color can be controlled to create stripes of varying widths and lengths.

Figure 3:
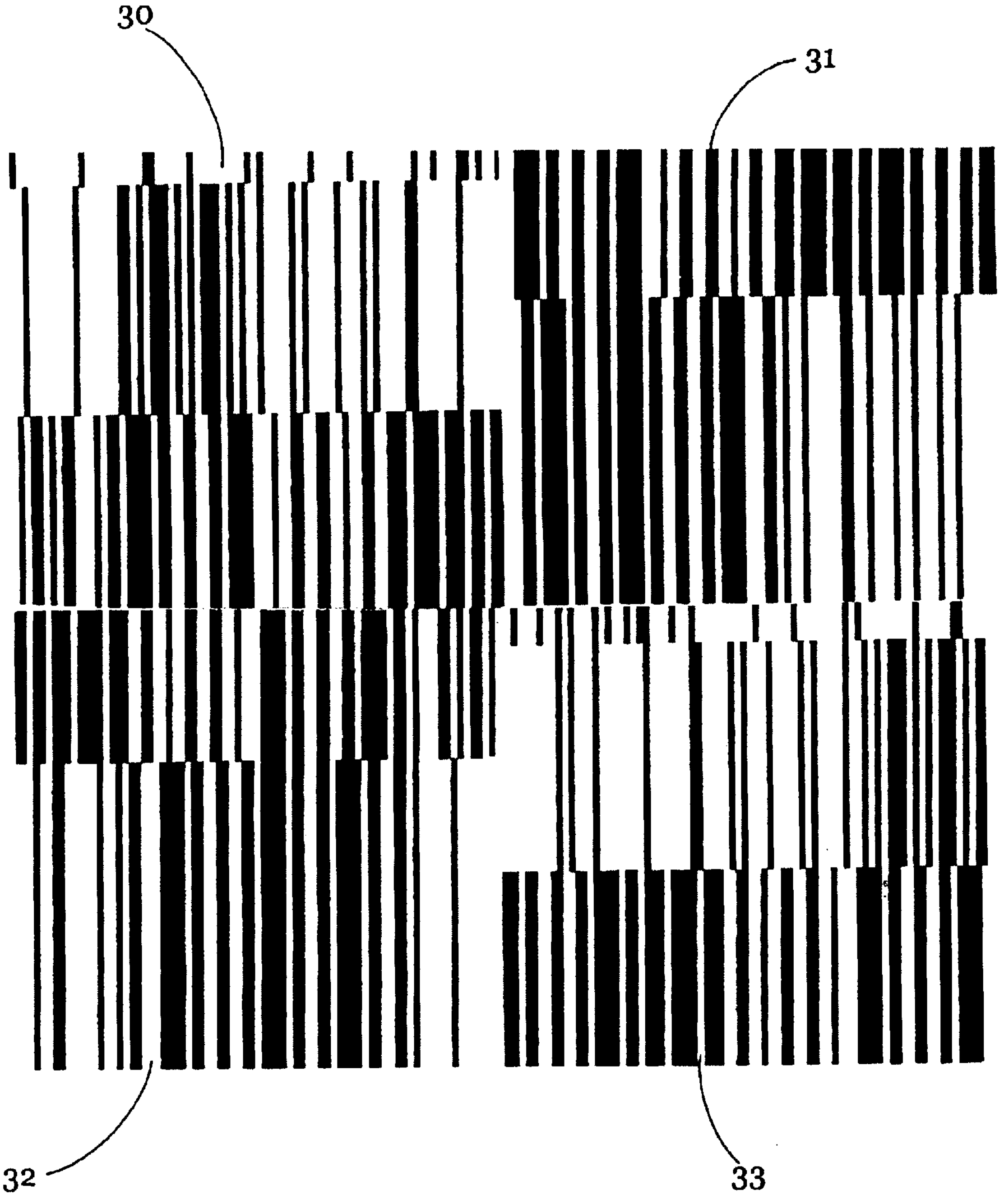
FIG. 3 illustrates tiles cut from a carpet web bearing a pattern of this invention and installed on a floor in one configuration using the conventional carpet tile installation method.
Figure 4:
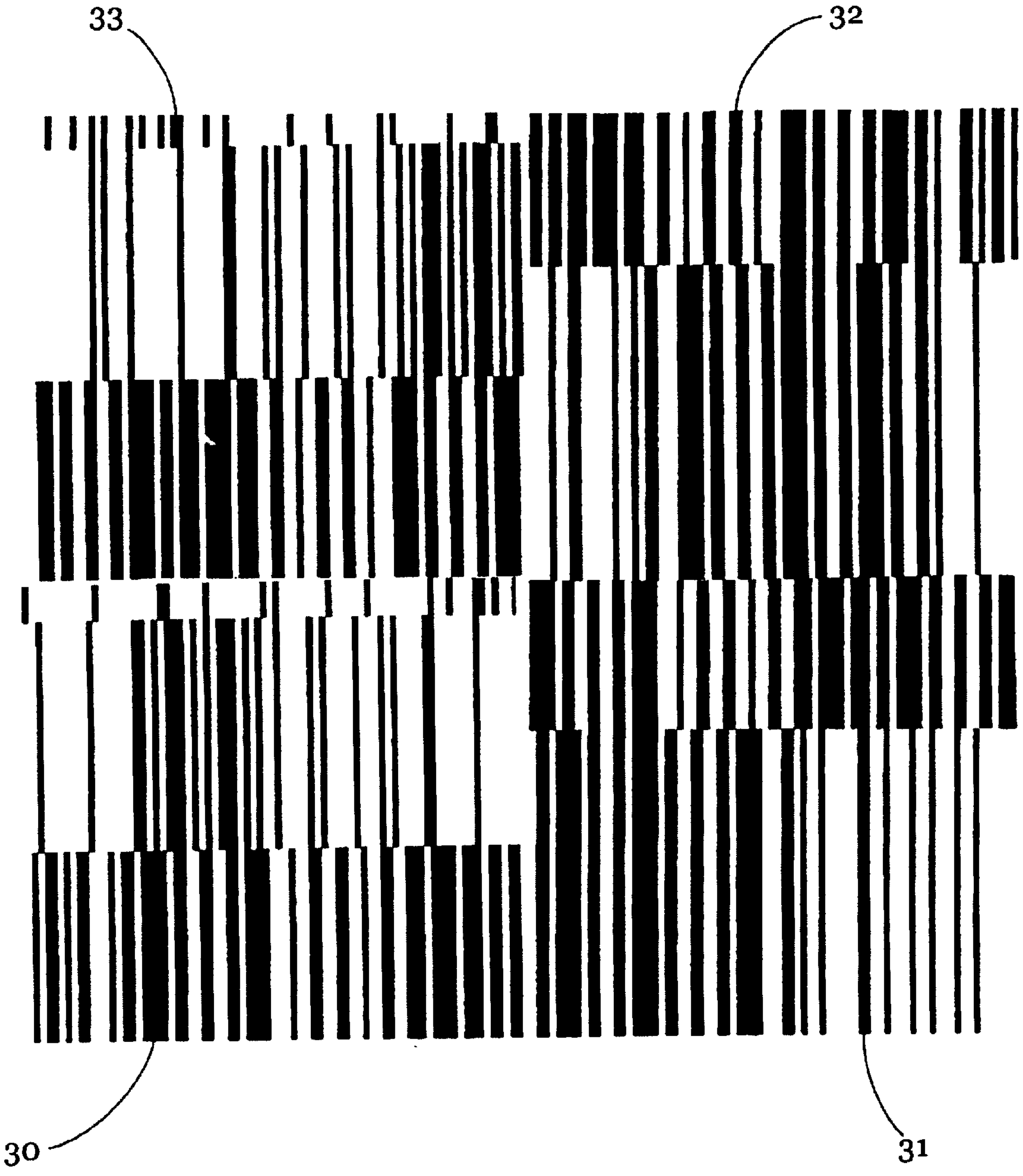
FIG. 4 illustrates the tiles of FIG. 3 installed on a floor in an alternative configuration using the conventional carpet tile installation method.

Tiles cut from a web exhibiting the above-described pattern need not be located on the floor in the same position they occupied in the web for the flooring installation to exhibit the desired uniform appearance. Instead, the tiles may be shuffled and laid in any side-by-side orientation (assuming that uniform rotational orientation is maintained) with respect to adjacent tiles without looking out of place to the ordinary viewer and without emphasizing that the flooring is modular, thereby still achieving an appearance of continuity across the entire installation as if the tiles were part of a broadloom web. While the tiles may be laid in a number of different positions relative to each other and thus each different configuration technically creates a different pattern, all of the patterns have the overall same appearance. FIGS. 3 and 4 illustrate this concept. FIG. 3 illustrates tiles 30–33 cut from a carpet web bearing a pattern of this invention and installed on a floor in one configuration using the conventional aligned rows and aligned columns carpet tile installation method. Tiles 30–33 are positioned side-by-side and oriented in the same direction. FIG. 4 illustrates the same tiles 30–33 installed on a floor in an alternative configuration. While tiles 30–33 have been positioned in different relative locations, the overall appearance of the carpeting remains unchanged. Thus, placement or replacement of one tile does not change the overall aesthetic effect.

Figure 5:
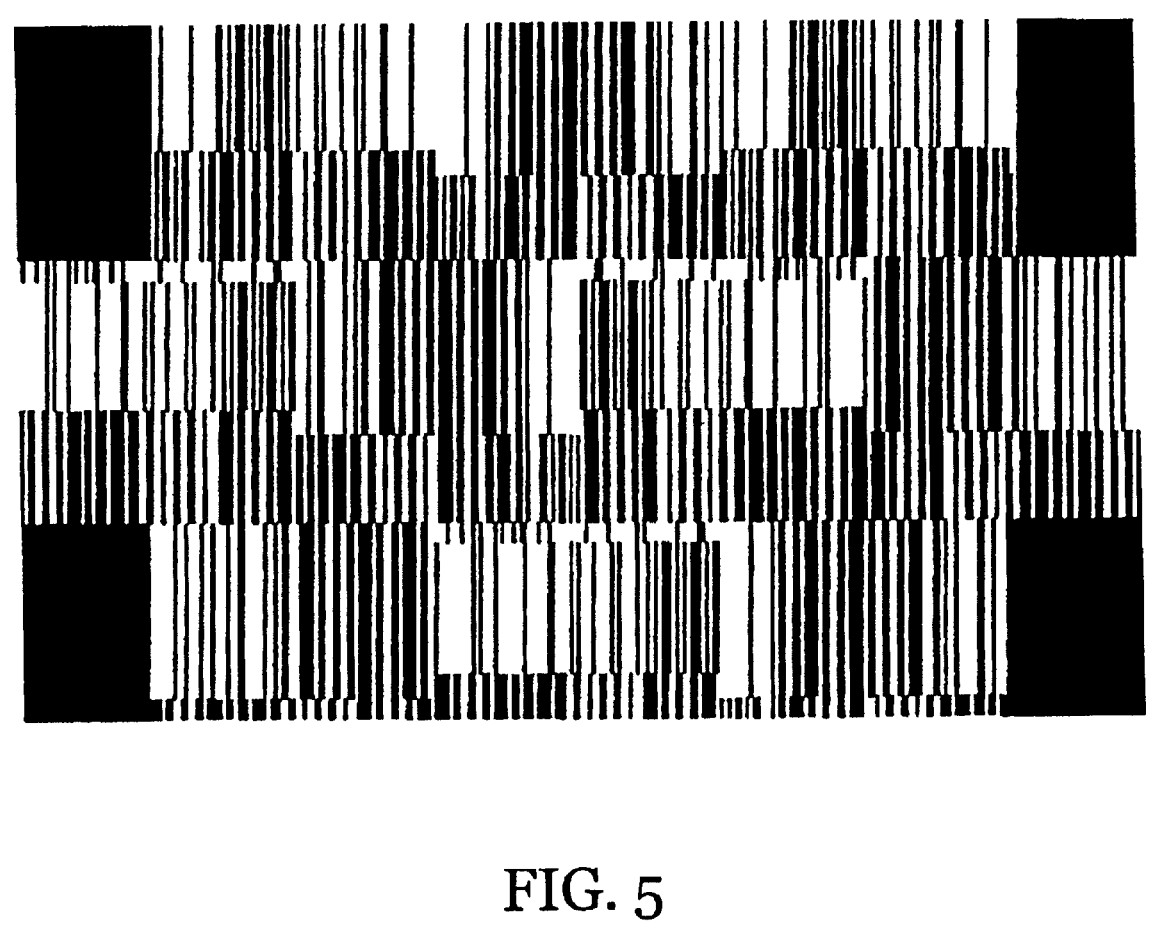

Similar to FIGS. 3 and 4, FIGS. 5 and 6 also illustrate tiles installed on a floor in a uniform rotational orientation. In FIG. 5, tiles in accordance with this invention have been installed using the brick-laid installation method whereby rows of carpet tiles are aligned, but the rows are staggered relative to each other to prevent formation of aligned columns.

Figure 6:
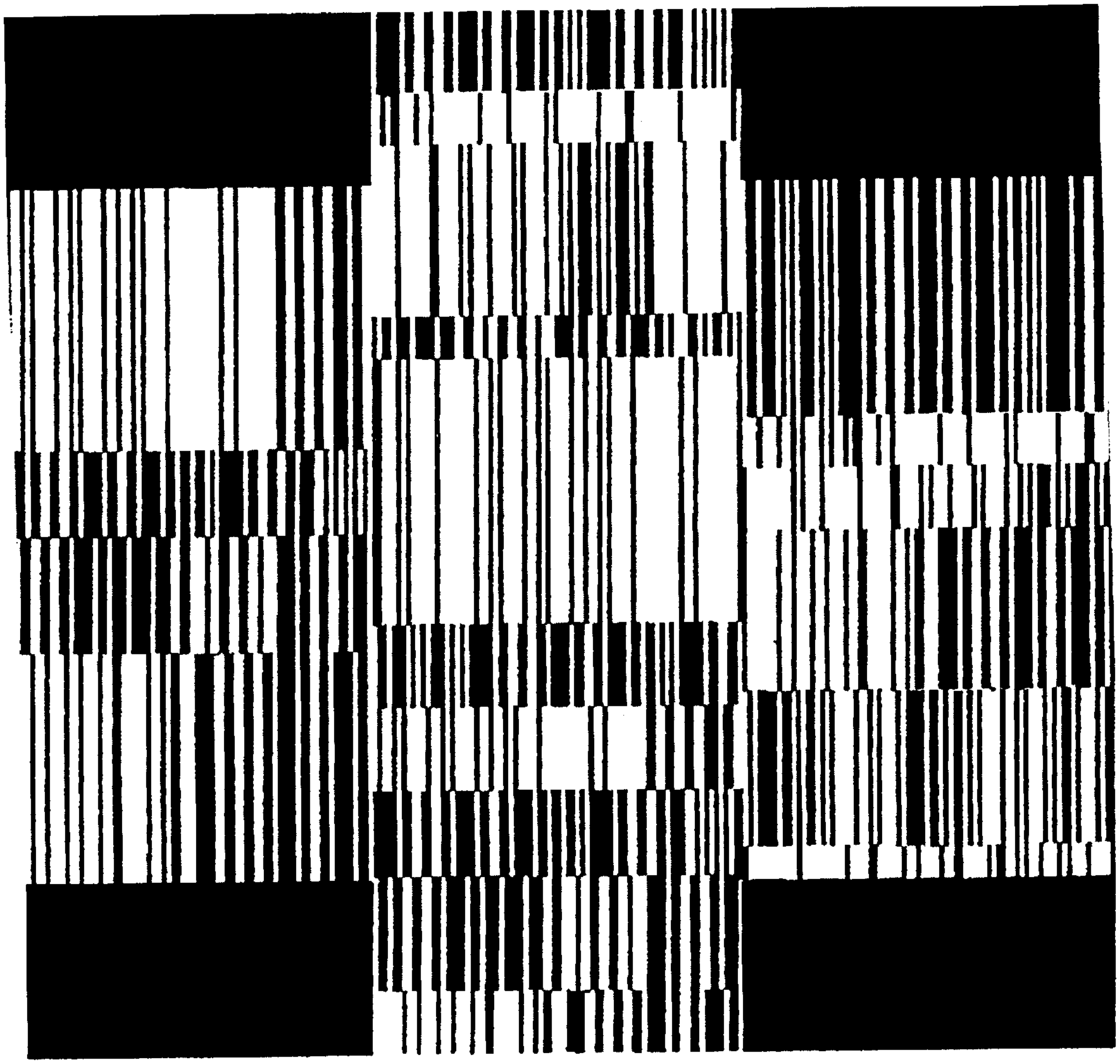
FIG. 6 illustrates tiles cut from a carpet web bearing a pattern of this invention and installed on a floor using the ashlar installation method.

Moreover, in FIG. 6, instead of the conventional carpet installation method, the tiles have been installed using the ashlar installation method, whereby the tiles are installed in a staggered orientation with columns of tiles shifted up or down relative to adjacent tile columns to prevent formation of aligned rows. Thus, in contrast to the brick-laid installation method, the ashlar installation method results in aligned columns, but misaligned rows. While in FIG. 6 the top and bottom edges of tiles in alternating columns are shown aligned, the tiles could be installed using the ashlar installation method so that these edges are also offset. As explained in the background section above, installing the carpet tiles using the ashlar installation method prevents formation of aligned horizontal rows of longitudinal discontinuities and thus helps de-emphasize the presence of the horizontal seams which can betray the modularity of the carpet installation.

Figure 7:
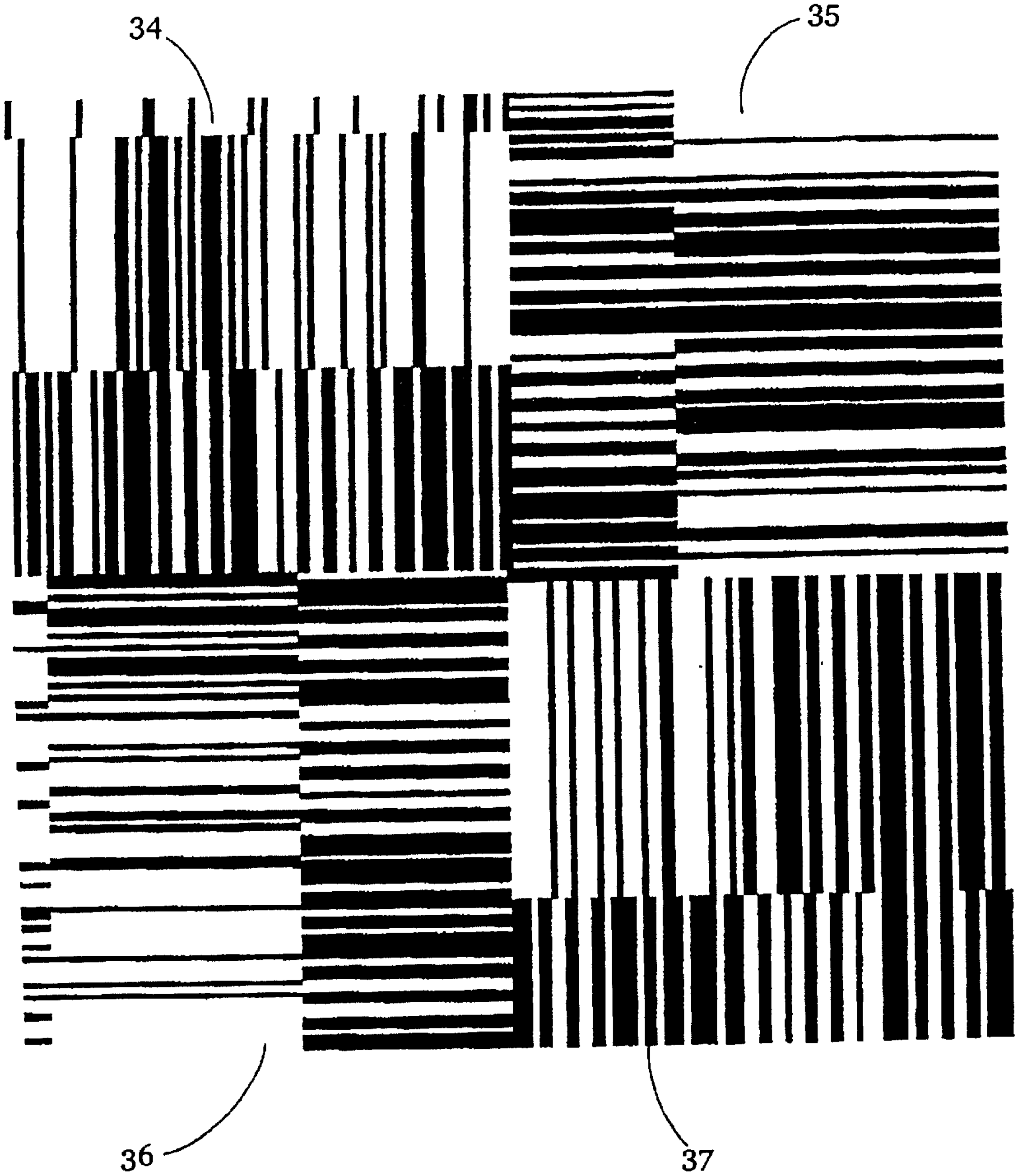
FIG. 7 illustrates tiles cut from a carpet web bearing a pattern of this invention and installed on a floor using the "quarter-turn" method.

Moreover, while the rotational orientation of the tiles can be uniform across the entire installation so that the tiles are all installed with the stripes oriented in the same direction, it need not be. FIG. 7 illustrates tiles 34–37 installed on a floor using the "quarter-turn" method, whereby alternating tiles may be "quarter-turned" so that the stripes on one tile are oriented at a 90° angle relative to the stripes on surrounding tiles. In such an installation, a first set of tiles (tiles 34 and 37) is uniformly rotationally oriented in a first direction and a second set of tiles (tiles 35 and 36) is uniformly rotationally oriented in a second direction that forms a 90° angle relative to the first direction. Thus, while the rotational orientation of the tiles in such an installation must be considered (and thus the tiles are "rotationally determinate"), it can be, but need not be, uniform across the entire installation.

The foregoing is provided for the purpose of illustrating, explaining and describing embodiments of the present invention. Further modifications and adaptations to these embodiments will be apparent to those skilled in the art and may be made without departing from the spirit of the invention or the scope of the following claims. For instance, different striped patterns than those illustrated can be used. Similarly, a wide variety of color combinations are possible. Furthermore, while the embodiment described above is tufted, the face fabric could also be woven on a conventional or computer controlled Jacquard or other loom, and the face fabric could be fusion bonded or formed in other manners. This invention could also be used for modular flooring or surface covering materials other than carpet tile, such as vinyl tile.

What is claimed is:

1. A carpet tile comprising a tile length and a pattern comprising a first group of substantially parallel, straight stripes that extend along a first portion of the tile length and that terminate on one side of a visual boundary transverse to the stripes and a second group of substantially parallel stripes beginning on the other side of the transverse boundary and extending along a second portion of the tile length wherein:

(i) the stripes of the first and second group are formed by at least two colors;

(ii) the stripes of the first group are substantially parallel to the stripes of the second group;

(iii) the stripes of the first and the second groups each comprise stripe width, wherein at least some of the stripe widths vary within each of the first and the second groups;

(iv) each stripe of the first group abuts at the boundary at least one stripe of the second group; and (v) each stripe of the first group contrasts with the at least one abutting stripe of the second group.

2. The carpet tile of claim 1, wherein the stripes of the first and second group are formed by more than two colors.

3. The carpet tile of claim 1, wherein the pattern is printed on the tile.

4. The carpet tile of claim 1, wherein the tile has a tufted face.

5. The carpet tile of claim 1, wherein the tile has a woven face.

6. The carpet tile of claim 1, wherein the tile has a fusion bonded face.

7. The carpet tile of claim 1, wherein the stripes of the first and second groups are formed by yarn tufts of at least a first color and a second color, at least some of the yarn tufts of the first color having a height greater than at least some of the yarn tufts of the second color proximate the tufts of the first color.

8. The carpet tile of claim 1, wherein at least some of the stripes of the first and second groups are oriented parallel to an edge of the carpet tile.

9. Floorcovering comprising a plurality of carpet tiles of claim 1 positioned on a flooring surface.

10. The floorcovering of claim 9, wherein the plurality of carpet tiles are positioned side-by-side on a flooring surface in the same rotational orientation.

11. The floorcovering of claim 10, further comprising a plurality of columns of tiles with aligned side edges, wherein top and bottom edges of tiles in adjacent columns are non-aligned.

12. The floorcovering of claim 11, wherein top and bottom edges of tiles in alternate columns are non-aligned.

13. The floorcovering of claim 11, wherein top and bottom edges of tiles in alternate columns are aligned.

14. The floorcovering of claim 10, further comprising a plurality of rows of tiles with aligned top and bottom edges, wherein side edges of tiles in adjacent rows are non-aligned.

15. The floorcovering of claim 9, wherein the plurality of carpet tiles are positioned in a first direction and a second direction rotated 90° from the first direction.

16. The floorcovering of claim 15, wherein each tile positioned in the first direction abuts only tiles positioned in the second direction.

17. The floorcovering of claim 9, wherein the patterns on the tiles are substantially non-identical.

* * * * *